(12) United States Patent
Abzarian et al.

(10) Patent No.: US 10,088,914 B2
(45) Date of Patent: Oct. 2, 2018

(54) MODIFYING INPUT DELIVERY TO APPLICATIONS

(71) Applicant: Microsoft Technology Licensing, LLC, Redmond, WA (US)

(72) Inventors: David Abzarian, Kenmore, WA (US); Hirofumi Yamamoto, Bellevue, WA (US); Youlian Simidjiyski, Seattle, WA (US); Alex G Snitkovskiy, Renton, WA (US); Ramachandran Gurumoorthy, Redmond, WA (US); Rouella J. Mendonca, Redmond, WA (US); Kelli Marie Zielinski, Covington, WA (US); Alice Tang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 13/917,507

(22) Filed: Jun. 13, 2013

(65) Prior Publication Data

US 2014/0368435 A1 Dec. 18, 2014

(51) Int. Cl.
*G06F 3/023* (2006.01)

(52) U.S. Cl.
CPC .......... *G06F 3/0233* (2013.01); *G06F 3/0237* (2013.01)

(58) Field of Classification Search
CPC .... G06F 3/0233; G06F 3/0237; G06F 17/273; G06F 17/276; G06F 3/04883
USPC ......... 345/156–168, 173–178; 715/255, 257, 715/259, 773; 704/10, 240
See application file for complete search history.

(56) References Cited

U.S. PATENT DOCUMENTS

| 3,959,775 | A  | * | 5/1976  | Valassis et al. | 710/113 |
|-----------|----|---|---------|-----------------|---------|
| 5,721,850 | A  | * | 2/1998  | Farry et al.    | 715/700 |
| 6,011,554 | A  | * | 1/2000  | King et al.     | 715/811 |
| 6,263,383 | B1 |   | 7/2001  | Lee             |         |
| 7,069,586 | B1 | * | 6/2006  | Winneg et al.   | 726/16  |
| 8,830,182 | B1 | * | 9/2014  | Alakuijala      | 345/173 |
| 2002/0023212 | A1 | * | 2/2002  | Proudler     | 713/164 |
| 2003/0036879 | A1 | * | 2/2003  | Sagar         | 702/150 |
| 2005/0144277 | A1 | * | 6/2005  | Flurry et al. | 709/225 |
| 2005/0182616 | A1 |   | 8/2005  | Kotipalli     |         |
| 2006/0281438 | A1 | * | 12/2006 | Gruchala et al. | 455/406 |

(Continued)

FOREIGN PATENT DOCUMENTS

CN 1154910 6/2004

OTHER PUBLICATIONS

"International Search Report & Written Opinion for PCT Patent Application No. PCT/US2013/060771", dated Feb. 19, 2014, Filed Date: Sep. 20, 2013, 8 pages.

(Continued)

*Primary Examiner* — Stacy Khoo
(74) *Attorney, Agent, or Firm* — Arent Fox LLP

(57) ABSTRACT

In some examples, input received from an input device, such as a keyboard, is modified by a component associated with an operating system before the input is delivered to an application. For instance, a component associated with the operating system may become registered for modifying input. In some situations, the input is modified based at least in part on metadata associated with the input device. For example, a location of a fingertip on a touch-sensitive display may be used to modify the input before delivery to an application.

18 Claims, 5 Drawing Sheets

(56) References Cited

U.S. PATENT DOCUMENTS

| | | | | |
|---|---|---|---|---|
| 2009/0058823 A1* | 3/2009 | Kocienda | ............. | G06F 3/0236 |
| | | | | 345/173 |
| 2009/0265716 A1 | 10/2009 | Prashanth | | |
| 2010/0251253 A1* | 9/2010 | Pike | ............................ | 718/104 |
| 2011/0191337 A1 | 8/2011 | Cort et al. | | |
| 2011/0193797 A1 | 8/2011 | Unruh | | |
| 2011/0219457 A1* | 9/2011 | Keshet | ................... | G06F 21/83 |
| | | | | 726/26 |
| 2012/0197825 A1 | 8/2012 | Medlock et al. | | |
| 2013/0050222 A1 | 2/2013 | Moran et al. | | |
| 2013/0191463 A1* | 7/2013 | Thubert et al. | ............... | 709/206 |
| 2014/0317731 A1* | 10/2014 | Ionescu | ........................... | 726/22 |

OTHER PUBLICATIONS

Arkon, "Tutorial—Keyboard Hook", Published on: May 29, 2003, Available at <<http://www.ragestorm.net/tutorial?id=10>>, 5 pages.

Esposito, Dino, "Windows Hooks in the .NET Framework", Published on: Oct. 2002, Available at <<http://msdn.microsoft.com/en-us/magazine/cc188966.aspx>>, 8 pages.

"Hooks Overview", Windows, Published on: Sep. 27, 2011, Available at <<http://msdn.microsoft.com/en-us/library/windows/desktop/ms644959(v=vs.85).aspx>>, 4 pages.

Translated Chinese Office Action dated May 3, 2017 for Chinese patent applicatoin No. 201380077382.4, a counterpart foreign application of U.S. Appl. No. 13/917,507, 18 pages.

"Second Office Action Issued in Chinese Patent Application No. 201380077382.1", dated Jan. 4, 2018, 6 Pages.

\* cited by examiner

MODIFYING INPUT DELIVERY TO APPLICATIONS

BACKGROUND

Input devices are used to provide information to a variety of software applications running on computing systems. For example, keyboards are often used to provide input for word processor applications, spreadsheet applications, database applications, internet applications, etc. Typically, input from a keyboard is routed through an operating system and then to the software application. For example, a device driver associated with the keyboard may receive the input and route the input to the application. The software application may then perform additional processing of the input. For example, an application may correct a misspelled word or may perform an action in response to a key character combination. Due to the large amount of software applications that exist today and the different types of data provided by various input devices, there are many different ways that applications process input.

SUMMARY

Implementations described herein provide for modifying input before delivering the input to applications. In some examples, input received from an input device, such as a keyboard, is modified by a component associated with an operating system before the input is delivered to an application. For instance, a component associated with the operating system may become registered for modifying input. In some situations, the input is modified based at least in part on metadata associated with the input device. For example, a location of a fingertip on a touch-sensitive input device may be used to modify the input before delivery to an application.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Modifying Input Delivery to Applications

Figure 1:
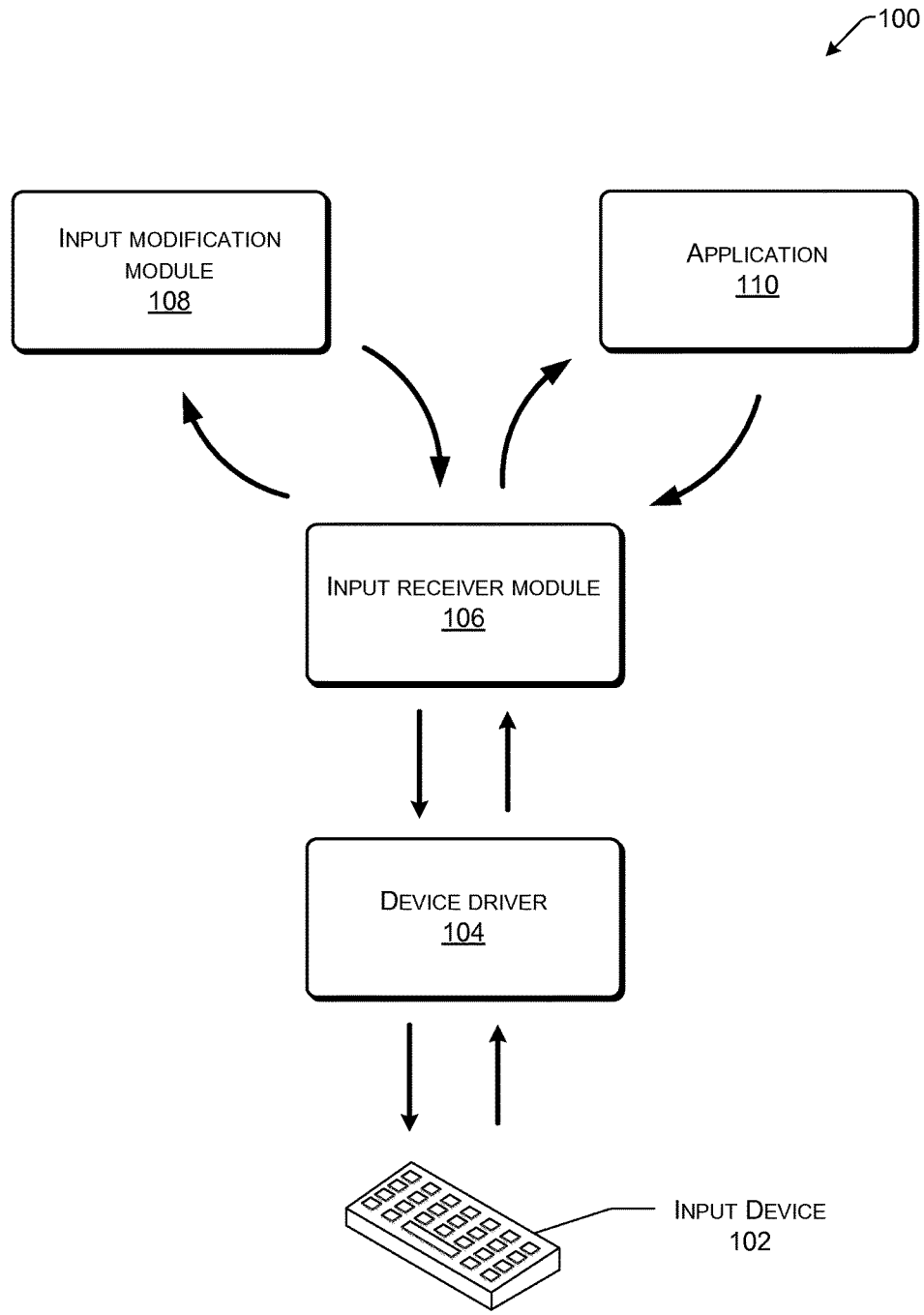
FIG. 1 is a block diagram illustrating an example environment including select components for modifying input delivery to an application according to some implementations.

The technologies described herein are generally directed toward modifying input delivery to applications. As used herein, input can by any type of information that is created based upon an input device. For example, input can be one or more characters or a representation of one or more characters that is received from an input device and is to be delivered to an application. For instance, a user may cause one or more characters to be sent to an application by touching one or more keys or locations on a keyboard or other touch sensitive input device. An application can be a software program executing on a computer system, such as a word processor applications, spreadsheet applications, database applications, internet applications, etc.

In some implementations, input received from an input device, such as a keyboard or other touch sensitive input device, is modified by an input modifying component associated with an operating system before the input is delivered to an application. As used herein, an input device or keyboard can include a touch sensitive surface (e.g., digitizer surface), a standard physical keyboard, a low profile or slim keyboard, an interactive display or interface, or any other type of touch sensitive device capable of providing touch based input (e.g., for delivery to an application). The input modifying component may become registered for modifying the input or otherwise assigned for modifying the input. For example, input from a keyboard can be received by a device driver, such as an HID (human interface device) class driver of the operating system, and then delivered to a component of the operating system, such as a kernel component. Instead of being delivered to the application, the input is delivered to the registered input modifying component, modified, and then delivered back to the kernel component. In response to receiving the modified input, the kernel component then delivers the modified input to the application.

In some implementations, the input is modified based at least in part on metadata associated with the input device. For example, a location of a fingertip on a touch-sensitive display may be used to modify the input before delivery to an application. Thus, if the metadata indicates that the fingertip contact was within a threshold distance of a shift key, then an associated character may be changed to uppercase before the character is delivered to an application.

In some implementations, a user may disable modifying of input before delivery to an application, which prevents the input modifying component from modifying the input. In other implementations, a user may disable the use or the delivery of metadata by the input modifying component. Furthermore, in some implementations, the user may disable the use or the delivery of a subset of the metadata, while enabling the use or the delivery of another subset of the metadata. In some implementations, the user may enable or disable certain types of input modification, such as auto-correction, text suggestion, and other predictive user interface features.

Example Environment

FIG. 1 is a block diagram illustrating an example environment 100 including select components for modifying input delivery to an application according to some implementations. The environment 100 can include various modules and functional components for performing the functions described herein. In the example, the environment 100 includes an input device 102. The input device 102 can comprise any type of device capable of providing input to a computing system or application, such as a keyboard, touch-sensitive keyboard, mouse, etc.

In the illustrated example, the environment 100 includes a device driver 104, which can comprise any type of device driver capable of interfacing and receiving input from the input device 102. In some implementations, the device driver 104 is an HID class driver. Furthermore, in some implementations, the device driver 104 is a component of a kernel of a host computer system that receives input from the input device 102. The kernel may be a protected area of memory and may be associated with a higher level of trust than other areas of memory.

The input receiver module 106 is a module or component of an operating system of the host computer system that receives the input from the device driver 104. In some implementations, the input receiver module 106 converts the input into one or more scan codes or hot keys. Furthermore, in some implementations, the receiver module 106 is a part of the kernel of the host computer system.

The input modification module 108 is a module or component associated with the operating system of the host computer system that receives the input from the input receiver module 106, modifies the input, and delivers the modified input back to the input receiver module 106. In some implementations, the input modification module 108 performs at least one of: correcting an error in the input, providing a suggestion associated with the input, removing one or more input characters from the input, replacing one or more input characters of the input, and adding one or more input characters to the input. The input receiver module 106 then delivers the modified input to an application 110. In some implementations, the application 110 requests or pulls the modified input from the input receiver module 106. In some examples, the functions performed by the device driver 104, the input receiver module 106, and the input modification module 108 along with other functions, can be performed by one module or by any larger number of modules.

In some implementations, the input receiver module 106 sends a request or query to input device 102 directly or through the device driver 104. The request or query may include a request for information regarding capabilities of the input device 102. For example, the capabilities of the input device may include the ability to provide metadata associated with the input, a probability of an input value, a position of at least one finger, and a size of the input device 102.

Example Computing System

Figure 2:
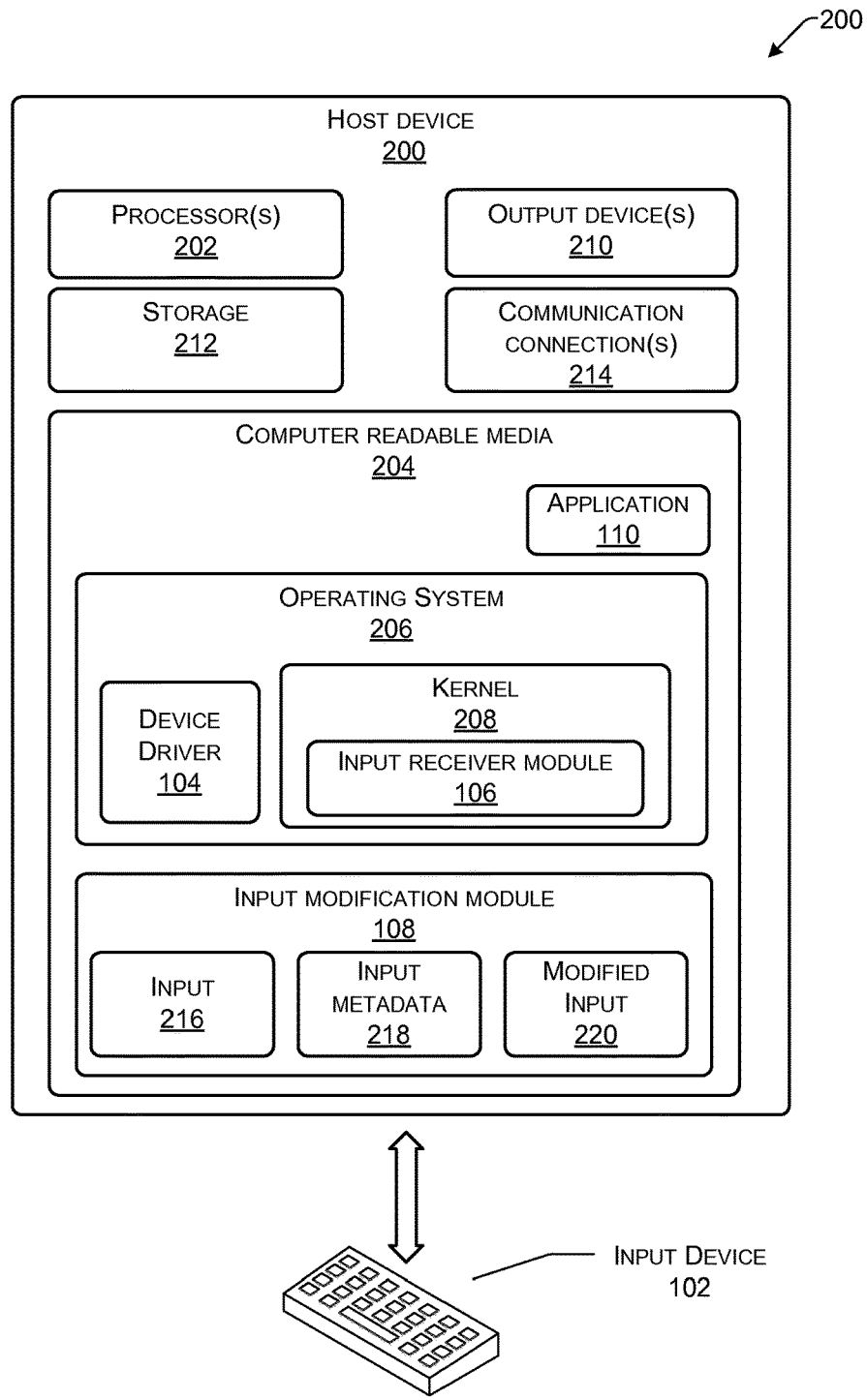
FIG. 2 is a block diagram illustrating a representative host device that can modify input delivery to an application.

FIG. 2 is a block diagram illustrating a representative host device 200 that can modify input delivery to an application. The host device 200 can be a computer, server, client system, laptop, mobile device, or any other computing system suitable for being used as a host for interacting with the input device 102. The host device 200 shown in FIG. 2 is only one example of a computing device and is not intended to suggest any limitation as to the scope of use or functionality of the computer and associated architectures.

In the illustrated example, the host device 200 includes one or more processors 204 and one or more computer-readable media 204 that includes the operating system 206, the application 110 and the input modification module 108. Furthermore, the operating system 206 includes the device driver 104 and the kernel 208, which includes the input receiver module 106. In some implementations, the operating system 206 includes the input modification module 108. In other implementations, the kernel 208 includes the input modification module 108. Thus, in different implementations, the input modification module 108 may exist in different portions of computer readable media 204, as long as the input modification module 108 can send data to and receive data from the input receiver module 106.

In some implementations, the input receiver module 106 is associated with a higher trust level than the input modification module 108. For example, the input receiver module 106 is associated with a kernel mode and the input modification module 108 is associated with a user mode.

In some implementations, the input receiver module 106 registers the input modification module 108 in response to identifying at least one attribute associated with the input device 102, a user or a session. In some implementations, the input modification module 108 registers itself with the input receiver module 106 in response to identifying at least one attribute associated with the input device 102, a user or a session. For example, the attribute can be a size of the input device 102, a type of the input device 102, a capability of the input device 102 to provide one or more types of metadata related to the input 216, a request by the user for modification of the input 216, or a request for the input 216 to be modified during the session. Furthermore, in some implementations, the input receiver module 106 provides the input 216 to the input modification module 108 in response to a blocking call.

Furthermore, in some implementations, one or more additional input modification modules 108 are associated or registered for modifying the input 216. In some implementations, a priority is assigned to each of the one or more additional input modification modules 108. For example, the priorities may be assigned by one of the input modification modules 108, each of the input modification modules 108, or by the input receiver module 106. Thus, modifying the input 216 may occur in one or more of the input modification modules 108 based on the priorities. For example, only a threshold number of the input modification modules 108 may be used, based on the priorities. For example, only the threshold number of input modification modules 108 are assigned for input modification, starting from the highest priority modules and proceeding to lower priority modules. Furthermore, the priorities may be assigned or changed based on at least one attribute associated with the input device 102, a user, or a session.

The host device 200 also includes one or more output devices 210, storage 222, and one or more communication connections 214. In the example, the input modification module 108 includes the input 216 from the input device 102 and the input metadata 218 associated with the input 216, either or both of which are used to create the modified input 220 for the application 110.

In some implementations, the input 216 includes at least one or more characters entered at the input device 102. A character can be a letter, number, or any other symbol capable of being input using the input device 102 or capable of being input into the application 110. Furthermore, the above components of the host device 200 are able to communicate through a system bus or other suitable connection.

In some implementations, the processor 202 is a microprocessing unit (MPU), a central processing unit (CPU), or other processing unit or component known in the art. Among other capabilities, the processor 202 can be configured to fetch and execute computer-readable processor-accessible instructions stored in the computer-readable media 108 or other computer-readable storage media. Communication connections 214 allow the device to communicate with other computing devices, such as over a network. These networks can include wired networks as well as wireless networks.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

Computer-readable media 204 can include various modules and functional components for enabling the host device 200 to perform the functions described herein. In some implementations, computer-readable media 108 can include the device driver 104, input receiver module 106 and the input modification module 108 for modifying input delivery to the application 110. The device driver 104, input receiver module 106 and the input modification module 108 can include a plurality of processor-executable instructions, which can comprise a single module of instructions or which can be divided into any number of modules of instructions. Such instructions can further include, for example, drivers for hardware components of the host device 100.

The device driver 104, input receiver module 106 and/or the input modification module 108 can be entirely or partially implemented on the host device 200. Although illustrated in FIG. 2 as being stored in computer-readable media 204 of host device 200, the device driver 104, input receiver module 106 and the input modification module 108, or portions thereof, can be implemented using any form of computer-readable media that is accessible by the host device 200. In some implementations, the device driver 104, input receiver module 106 and/or the input modification module 108 are implemented partially on another device or server. Furthermore, computer-readable media 204 can include other modules, such as other device drivers, program data, and the like, as well as data used by the input modification module 108 and other modules (e.g., the input 216, the input metadata 218 and the modified input 220).

Computer-readable media 204 or other machine-readable storage media stores one or more sets of instructions (e.g., software) embodying any one or more of the methodologies or functions described herein. The instructions can also reside, completely or at least partially, within the computer-readable media 204 and within the processor 202 during execution thereof by the host device 200. The program code can be stored in one or more computer-readable memory devices or other computer-readable storage devices, such as computer-readable media 204. Further, while an example device configuration and architecture has been described, other implementations are not limited to the particular configuration and architecture described herein. Thus, this disclosure can extend to other implementations, as would be known or as would become known to those skilled in the art.

Example of Modifying Input Delivery

Figure 3:
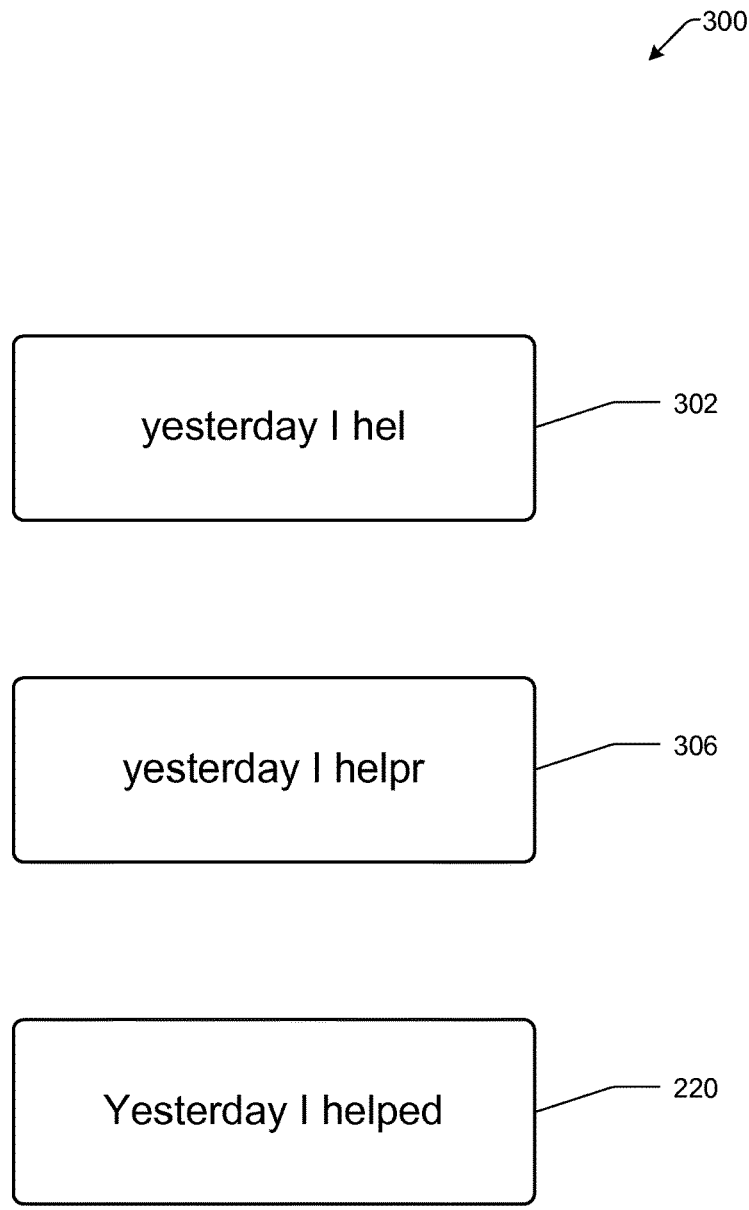
FIG. 3 illustrates an example of modifying input delivery to an application according to some implementations.

FIG. 3 illustrates an example of modifying input delivery to an application according to some implementations. In the example, the input 302 and the input 306 are input to the host device 200 using input device 102. The input 302 and the input 306 are each examples of the input 216 of FIG. 2. Furthermore, the input 302, the input 306 and the modified input 220 are presented on the output device 210, which can be a display, monitor or other device suitable for presenting graphical output. In some implementations, one or more of the input 302, the input 306 and the modified input 220 are not presented on an output device, but are still delivered to the application 110.

In the example, the input 302 includes the characters "yesterday I hel," which is delivered to the input modification module 108. In the example, the input modification module 108 modifies the input 302 based on analyzing the input. Analyzing the input 302 can include analyzing context and relationships between two or more characters of the input 302. In the example, the input modification module 108 modifies the input 302 to create the modified input 220 by changing a "y" character to "Y" and adding the characters "ped" to the input 302. Thus, the input modification module 108 performed auto-correction and added new characters to the input 302 based on analyzing the input 302.

In the example, the input 306 includes the characters "yesterday I helpr," which is delivered to the input modification module 108. In the example, the input modification module 108 modifies the input 306 based on analyzing the input. Analyzing the input 306 can include analyzing context and relationships between two or more characters of the input 306. In the example, the input modification module 108 modifies the input 306 to create the modified input 220 by changing a "y" character to "Y," removing the character "r" and adding the characters "ed" to the input 306. Thus, the input modification module 108 performed auto-correction and added new characters to the input 306 based on analyzing the input 306.

In some implementations, the input modification module 108 modifies at least part of the input 216. For example, the input modification module 108 can correct an error in the input, provide a suggestion associated with the input, remove one or more input characters from the input, replace one or more input characters of the input, and add one or more input characters to the input. Furthermore, in some implementations, the input modification module 108 also receives the metadata 218 associated with the input device and modifies at least part of the input 216 based on the metadata 218.

For example, the metadata 218 can be at least one of a probability of an input value, a position of at least one finger, and a size of the input device. Thus, based on detecting touch input, the probability of the input value can be determined and used to modify the input 216. For example, a probability of a user intending to enter a particular character may be greater than a probability of the user intending to enter another character, based on the detecting. Moreover, in some implementations, other factors can be used in combination with the detection to modify the input 216. For example, contextual analysis can be factored into a determination of whether and how to modify the input 216.

Example Processes

In the following flow diagrams, each block represents one or more operations that can be implemented in hardware, software, or a combination thereof In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. While several examples are described herein for explanation purposes, the disclosure is not limited to the specific examples, and can be extended to additional devices, environments, applications and settings. For discussion purposes, the processes below are described with reference to the environment 100 of FIG. 1, although other devices, systems, frameworks, and environments can implement this process.

Figure 4:
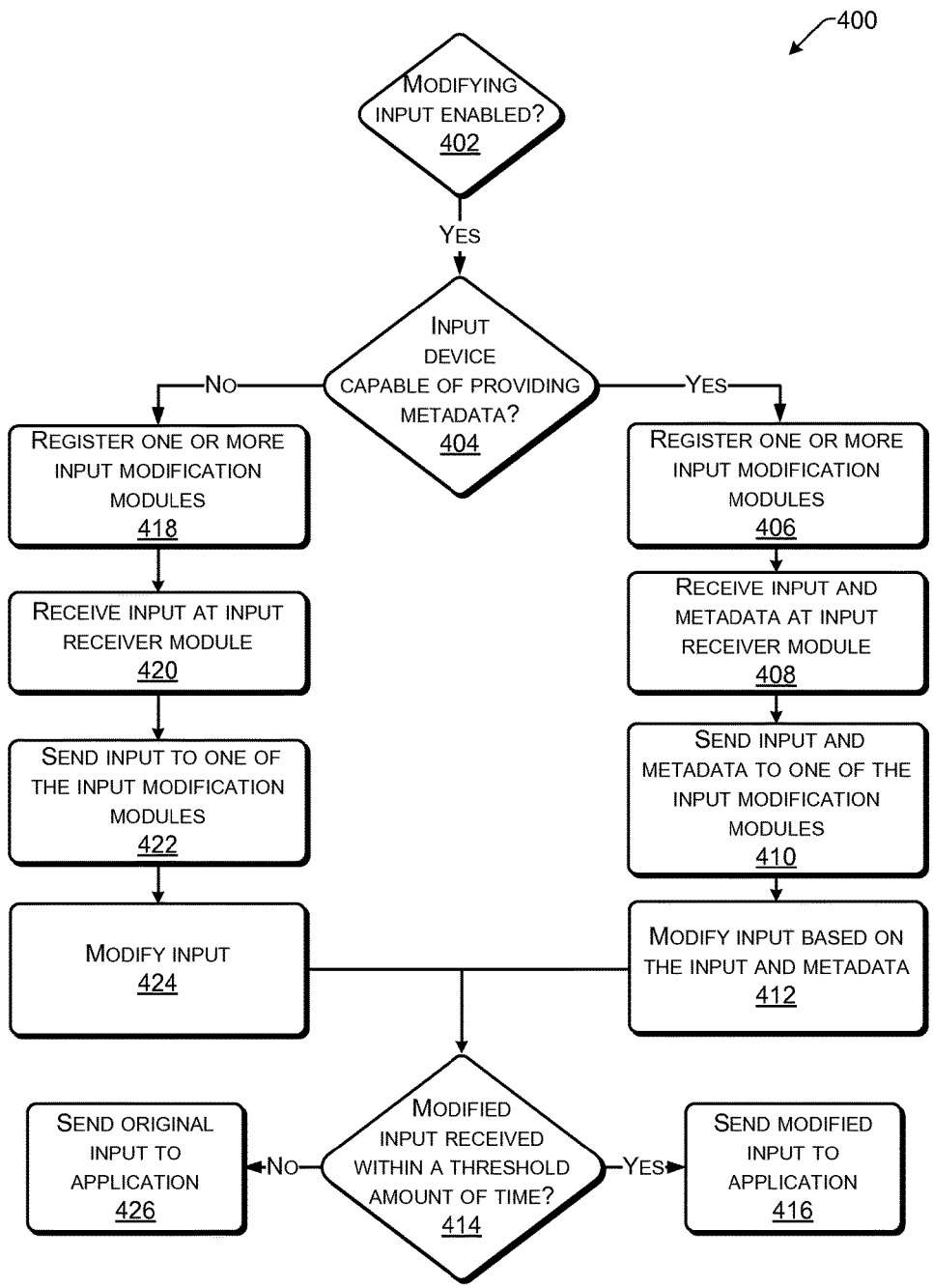
FIG. 4 is a flow diagram of an example process of modifying input delivery to an application according to some implementations.

FIG. 4 is a flow diagram of an example process 400 of modifying input delivery to an application according to some implementations. At 402, the input receiver module 106 determines whether modifying input delivery to the application 110 is enabled. In some implementations, the steps are performed by another component of the host device 200, such as the input modifier module 108.

If the input receiver module 106 determines that modifying input is enabled, then at step 404, the input receiver module 106 determines whether the input device 102 is capable of providing input metadata 218. If the input receiver module 106 determines that the input device 102 is capable of providing input metadata 218, then at step 406, the input receiver module 106 registers one or more input modification modules 108 for modifying the input 216.

At 408, the input receiver module 106 receives the input 216 and the input metadata 218. In some implementations, the device driver 106 receives the input 216 and the input metadata 218 before delivering the input 216 and the input metadata 218 to the input receiver module 106.

At 410, the input receiver module 106 sends the input 216 and the input metadata 218 to the one or more input modification modules. At 412, the input modification module 108 modifies the input 216 based on analyzing the input 216 and based on the input metadata 218. At 414, the input receiver module 106 determines whether the modified input 220 is received within a threshold amount of time. For example, the threshold amount of time may be approximately one or more milliseconds or any other amount of time suitable for the application 110.

If the input receiver module 106 determines that the modified input 220 is received within the threshold amount of time, then at 416, the input receiver module 106 sends the modified input 220 to the application 110. Otherwise, the input receiver module 106 sends the input 216 to the application 110 without modification.

Returning to 404, if the input receiver module 106 determines that the input device 102 is not capable of providing input metadata 218, then at 418, the input receiver module 106 registers one or more input modification modules 108 for modifying the input 216.

At 420, the input receiver module 106 receives the input 216. In some implementations, the device driver 106 receives the input 216 before delivering the input 216 to the input receiver module 106.

At 422, the input receiver module 106 sends the input 216 to the one or more input modification modules. At 424, the input modification module 108 modifies the input 216 based on analyzing the input 216. At 414, the input receiver module 106 determines whether the modified input 220 is received within a threshold amount of time. As discussed above, depending on the determination, the input receiver module 106 sends the modified input 220 or the input 216 to the application 110.

Figure 5:
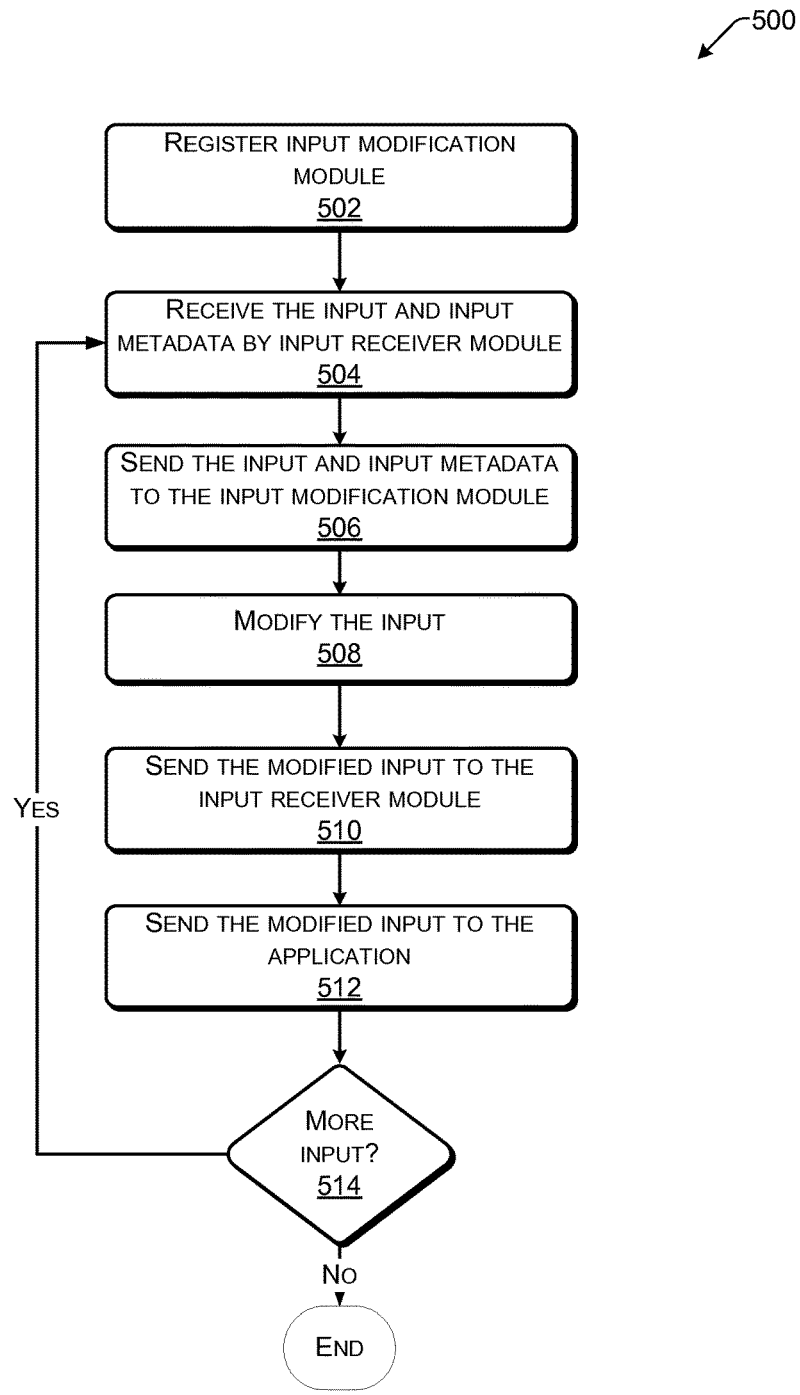
FIG. 5 is a flow diagram of an example process of modifying input delivery to an application according to some implementations.

FIG. 5 is a flow diagram of an example process 500 of modifying input delivery to an application according to some implementations. At 502, the input receiver module 106 registers the input modification module 108. In some implementations, the steps are performed by another component of the host device 200, such as the input modifier module 108.

At 504, the input receiver module 106 receives the input 216 and the input metadata 218. In some implementations, the device driver 106 receives the input 216 and the input metadata 218 before delivering the input 216 and the input metadata 218 to the input receiver module 106.

At 506, the input receiver module 106 sends the input 216 and the input metadata 218 to the input modification module 108. At 508, the input modification module 108 modifies the input 216 based on at least one of analyzing the input 216 and analyzing the input metadata 218. At 510, the input modification module 108 sends the modified input 220 to the input receiver module 106. At 512, the input receiver module 106 sends the modified input 220 to the application 110.

At 514, the input receiver module 106 determines whether there is any more input 216 from the input device 102 for the application 110. If the input receiver module 106 determine that there is more input 216 from the input device 102 for the application 110, then the process returns to 504. Otherwise, the process ends.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and can be implemented in general purpose and special-purpose computing systems, or other devices having processing capability. Generally, any of the functions described with reference to the figures can be implemented using software, hardware (e.g., fixed logic circuitry) or a combination of these implementations. Thus, the processes, components and modules described herein can be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one example" "some examples," "some implementations," or similar phrases means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
identifying, by a computing device, an attribute, wherein the attribute is associated with at least one of:
an input device;
a user; or
a session;
registering by the computing device, at least one input modification component of a plurality of input modification components associated with an operating system of the computing device, wherein the at least one input modification component is selected from the plurality of input modification components based on the attribute;
receiving, by the computing device, input from the input device for delivery to an application of the computing device, the input including at least one or more characters entered at the input device;
determining whether metadata associated with the input device is received, the metadata comprising data defining an input position on the input device;
modifying, by the at least one input modification component in response to the metadata being received, at least a part of the input to create modified input based at least on the metadata associated with the input device;
modifying, by the at least one input modification component in response to the metadata not being received, at least a part of the input to create the modified input based on analyzing the input; and
delivering, by the computing device, the modified input to the application.

2. The method as recited in claim 1, wherein the receiving and the delivering are performed by a module of the operating system and the module is associated with a higher trust level than the at least one input modification component.

3. The method as recited in claim 2, wherein the module is associated with a kernel mode and the at least one input modification component is associated with a user mode.

4. The method as recited in claim 1, further comprising providing the input to the at least one input modification component in response to a blocking call.

5. The method as recited in claim 1, wherein modifying at least part of the input comprises at least one of providing a suggestion associated with the input, removing one or more input characters from the input, replacing one or more input characters of the input, or adding one or more input characters to the input.

6. The method as recited in claim 1, wherein the input position on the input device being associated with input from at least one finger on the input device.

7. The method as recited in claim 1, further comprising:
registering the plurality of input codification components for modifying the input from the input device; and
assigning a priority to each of the plurality of input modification components.

8. A system, comprising,:
a memory;
an input device configured to receive an input from a user for delivery to an application, the input includes at least one or more characters; and
one or more processors configured to:
register at least one input modification module of a plurality of input modification modules associated with an operating system, wherein the at least one input modification module is selected from the plurality of input modification modules based on an attribute associated with at least one of the input device, the user, or a session;
determine whether metadata associated with the input device is received, the metadata comprising data defining an input position on the input device;
modify, via the at least one input modification module in response to the metadata being received, at least a part of the input to create modified input based at least on the metadata associated with the input device;
modifying, via the at least one input modification module in response to the metadata not being received, at least a part of the input to create the modified input based on analyzing the input; and
deliver, via an input receiver module, the modified input to the application.

9. The system as recited in claim 8, wherein the input receiver module is associated with a higher trust level than the input modification module.

10. The system as recited in claim 8, wherein the input receiver module is associated with a kernel mode and the input modification module is associated with a user mode.

11. The system as recited in claim 8, wherein to modify the input, the one or more processors are further configured to replace one or more input characters of the input.

12. The system as recited in claim 8, wherein the input position on the input device is associated with input from at least one finger on the input device.

13. The system as recited in claim 8, wherein the input receiver module is configured to assign a priority to the plurality of input modification modules.

14. A computer readable storage device having instructions stored therein that, when executed by one or more processors, cause the one or more processors to perform functions, comprising:
identifying an attribute associated with at least one of an input device, a user, or a session;
registering a component of a plurality of components associated with an operating system, wherein the component is selected from the plurality of components based on the attribute;
receiving an input from the input device for delivery to an application, the input including at least one or more characters entered at the input device;
determining whether metadata associated with the input device is received, the metadata comprising data defining an input position on the input device;
modifying, in response to the metadata being received, at least a part of the input to create modified input based at least on the metadata associated with the input device;
modifying, in response to the metadata not being received, at least a part of the input to create the modified input based on analyzing the input; and
delivering the modified input to the application.

15. The computer-readable storage device as recited in claim 14, wherein modifying at least part of the input further comprises at least one of providing a suggestion associated with the input or replacing one or more input characters of the input.

16. The computer-readable storage device as recited in claim 14, wherein the input position on the input device is associated with input from at least one finger on the input device.

17. The computer-readable storage device as recited in claim 14, further comprising instructions stored therein that, when executed, cause the one or more processors to perform the function of, prior to the modifying, disabling use of a subset of the metadata for modifying at least a pad of the input.

18. The computer readable storage device as recited in claim 14, further comprising instructions stored therein that, when executed by the one or more processors, cause the one or more processors to perform the function of assigning a priority to the plurality of modules.

\* \* \* \* \*